Patented Apr. 9, 1940

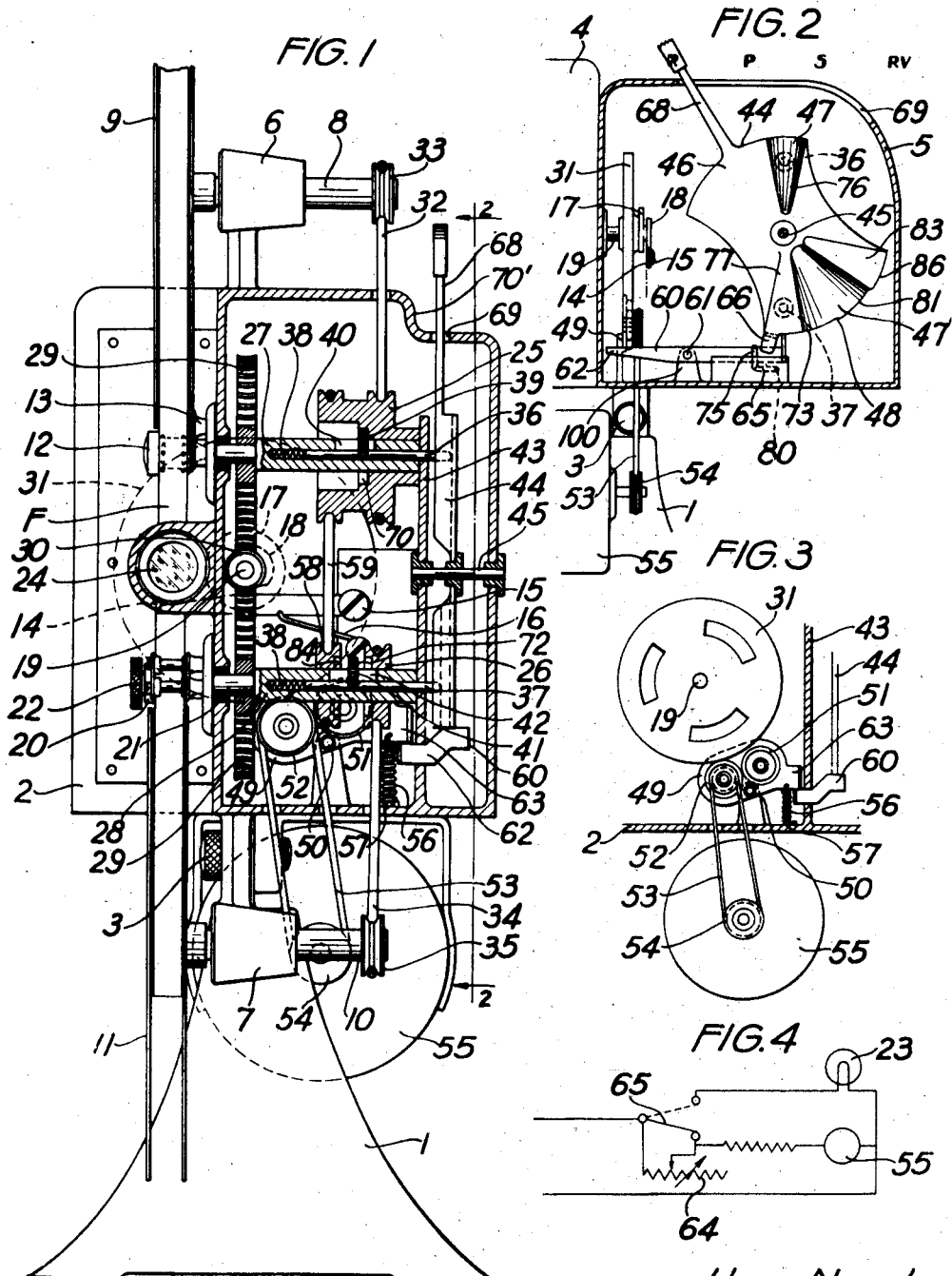

2,196,738

UNITED STATES PATENT OFFICE 2,196,738

MOTION PICTURE APPARATUS

Hugo Nagel, Harrow, England, assignor to Eastman Kodak Company, Rochester, N. Y., a corporation of New Jersey Application January 21, 1938, Serial No. 186,089
In Great Britain March 2, 1937

16 Claims. (Cl. 88—17)

The present invention relates to a cinematographic apparatus and particularly to projection apparatus.

For motion picture apparatus, particularly for motion picture projectors, it is desirable to move the film forwardly at a normal speed for projecting, and rearwardly at normal speed for projecting the film backward. It is also useful to provide a mechanism by means of which the film may run backward at a high speed for rewinding, and to provide a mechanism by means of which the film may remain stationary in the film gate for the projection of "stills."

The general object of the present invention is the provision of a projector comprising an improved and simplified arrangement of parts for accomplishing any number or all of the above-mentioned operations, said parts being under the control of a single control member which selectively positions the parts for accomplishing the desired operation. One particular object of the present invention is to provide a projector of the type referred to wherein the parts are so arranged that the various directions and speeds of the film can be readily obtained by moving the single control member between a plurality of predetermined positions. A further object of the invention is to provide a projector in which the parts are such and are so arranged that the control member acts directly on the same or is connected thereto through the fewest number of parts. Another object of the invention is to provide a projector wherein the supply shaft rotates at one speed for projection, but rotates at a higher speed for rewinding. And yet another object is to provide a projector wherein the lamp is turned off automatically as the mechanism is set for rewinding. Another object of the present invention is the provision of a projector of the type referred to, in which the control member comprises a plate having a plurality of cam surfaces which serve to shift the parts as desired, said cam surfaces being of such contour and being so arranged relative to one another that the shifting of the parts of the apparatus are properly coordinated so that damage to the film from incorrect manipulation of the machine control cannot result. Another object of the present invention is to provide a novel arrangement of parts which permit automatic control of the several operations of the projector through the medium of a single control member and the fewest number of interconnecting parts. And a further object is to provide a projector of the type referred to, which is efficient in operation, relatively cheap to manufacture and very simple to operate.

In accordance with one feature of the present invention, the parts for controlling the take-up and supply spindles of the projector are operable by a multiple cam, preferably provided as face and edge cams on a member which is conveniently operated manually by a single lever. The multiple cams may be so constructed as to effect control of the projector for normal projection and rewind only. Preferably, however, it is capable of controlling also operation of the apparatus for still projection and reverse feeding of the film.

One set of cams may effect control of a tilting bracket member which carries frictionally engaging wheels, one of which is constantly driven through a belt and pulley from a prime mover, such as an electric motor. According to the particular cam which is brought into operation, one or the other of the pulleys on the bracket can be brought into frictional driving engagement with a pulley mounted, for example, on the shutter shaft, or alternatively both pulleys may be removed to a neutral position in which neither engage with the shutter pulley.

The set of cams for controlling the direction of rotation of the shutter shaft may work in conjunction with a further set of cams which directly control the operative driving connection of the pulleys connected with the take-up and supply spindles of the apparatus.

A further cam or projection is provided on the control member for automatically cutting out the projection lamp, and/or the speed regulating resistance of the motor when the apparatus is set for rewinding of the film, thereby prolonging the life of the lamp and increasing the speed of drive for rewinding of the film.

The novel features that I consider characteristic of my invention are set forth with particularity in the appended claims. The invention itself, however, both as to its organization and its methods of operation, together with additional objects and advantages thereof, will best be understood from the following description of the specific embodiments when read in connection with the accompanying drawing in which, Fig. 1 is a front view of a projector, partly in section and partly in elevation, constructed in accordance with and illustrating a preferred embodiment of my invention, the parts being shown in position for rewinding a film, Fig. 2 is a partial side view of the projector, partly in section and partly in elevation, the section being taken substantially on line 2—2 of Fig. 1 with certain parts removed for the sake of clarity, and showing the control member in its rewind position, Fig. 3 is a detail of the transmission member between the motor and the main drive shaft, and Fig. 4 is a wiring diagram of the projector.

Like reference characters refer to corresponding parts throughout the drawing.

As a typical embodiment of my invention, I have shown a projector equipped to drive a film forwardly at normal speed for projecting, to drive the film rearwardly at normal speed for projecting, to drive a film rearwardly at high speed for rewinding, and to hold the film stationary in the gate for projecting "stills." It is obvious that many of the features of my invention could be applied to a camera as well as to a projector. Although I have shown a projector capable of all the enumerated operations, it is obvious that the projector may only include the combination of any two or more of these operations and still be controlled by a single control member in the manner to be described.

In the forms shown in the drawing, a projector may consist of a base 1 on which a housing 2 is pivoted at 3, said housing including a lamphouse, indicated generally at 4, and a mechanism compartment 5. To the top and bottom of the housing 2 are fixedly mounted brackets 6 and 7, bracket 6 rotatably supporting the supply spindle 8 on which the supply reel 9 may be mounted, and bracket 7 rotatably supporting the take-up spindle 10 on which the take-up reel 11 may be mounted. In the normal operation of the machine, the film F is drawn from the supply reel 9 and is passed about the sprocket 12 in contact with which it is held by the usual guide rollers indicated at 13. From this bracket the film is looped through the usual film gate, not shown, through which it is intermittently moved by means of a claw 14 which may be of any well known variety, and which I have chosen to show for purposes of illustration as including the claw 14 pivoted at 15, normally spring pressed in an upward direction by the spring 16, and actuated by a pair of suitable cams 17 and 18 connected to the main drive shaft 19. A second sprocket 20 similar to sprocket 12 is mounted on shaft 21 to which there is also fixed a hand wheel 22 by means of which the shaft may be manually turned as is occasionally useful in threading the machine of this kind, or for turning the mechanism so that the shutter will be in an open position for the projection of "stills." The projector also includes the usual lamp 23 which is mounted in the lamphouse behind the film gate, and the objective 24 to which the illuminated picture frames are projected onto a screen.

The mechanism for controlling the drive of the take-up and supply spindles 8 and 10 comprises pulleys 25 and 26 respectively, which are loosely mounted within the mechanism compartment 5 on upper and lower shafts 27 and 28 which are driven in opposite directions by means of worm wheels 29 driven from a common worm 30 fixed to the main drive shaft 19 to which the shutter 31 for the projector is fixed. The pulley 25 is drivingly connected to the supply spindle 8 through the medium of belt 32 passing over a pulley 33 on the supply spindle 8 and the pulley 25, while the take-up pulley 26 is drivingly connected to the take-up spindle 10 by means of belt 34 passing over pulley 35 fixed to the take-up spindle 10 and pulley 26. Both of the shafts 27 and 28 are made tubular to accommodate plungers 36 and 37, which are slidably positioned within the shafts and normally spring pressed outwardly therefrom by springs 38. Each plunger is connected to its respective shaft so as to be capable of axial movement relative to the shaft, but to be constantly rotated with the shaft. This connection comprises a drive pin 39 extending radially from plunger 36 through a longitudinal slot 40 in the shaft 27, and a drive pin 41 extending radially from the plunger 37 through a longitudinal slot 42 in the shaft 28. The slidable plungers and pins constitute pin clutches which may be engaged with selected loose pulleys on the hollow shafts for the purpose of effecting the required operation of the apparatus as will be hereinafter fully described.

The slidable plungers extend through apertures in a supporting plate 43 within the mechanism compartment 5 and into engagement with the control member 44 mounted for rotation about a shaft 45 mounted between and parallel to the shafts 27 and 28. This control member takes the form of a plate member, see Fig. 2, the face of which is provided with cams in the form of raised and depressed portions 46 and 47 for selectively engaging or disengaging the plungers 36 and 37 of the pulleys 25 and 26 on the hollow shafts 27 and 28 and connected with the pulleys on the supply and take-up spindles.

The control member is also formed with edge cams indicated generally at 48 for controlling a bracket 49 pivotally mounted on the pin 50 fixed to a part of the housing 2. This bracket 49 supports a pair of wheels 51 and 52 which are in constant frictional engagement with each other, one of the wheels 52 being connected by a belt 53 with a pulley 54 secured to the shaft on the electric motor 55. Accordingly, in operation of the bracket, both wheels are constantly driven in opposite directions. Normally, one of the wheels 52 is held in frictional engagement with a pulley mounted on the main drive shaft 19 of the projector by the spring 56, one end of which is connected to the bracket 49 while the other end thereof is connected to the housing 2 at 57, this position of the bracket tending to drive the main drive shaft in the direction necessary to effect normal projection. The bracket 49 and the wheels 51 and 52 thereof constitute a transmission member by means of which power from the motor is transmitted to the driving mechanism for the film feeding means and the take-up and supply spindles, and for the purpose of simplicity in structure and for illustrative purposes, I have shown the pulley engaged by said transmission member as constituting the shutter 31 of the projector. The shutter 31 can be made to serve in this capacity as described merely by making it of a little heavier construction than is usual, and by so doing a single part is made to serve two functions thereby simplifying the complete machine.

For reverse motion of the projection, it will be understood that the direction of drive of every film feeding part must be reversed, and for this purpose the bracket 49 is moved to bring the wheel 51 into engagement with the shutter 31, and the drive to the supply spindle is properly made by having the double supply pulley 25 connected to a pulley 58, which is rotatably mounted on a shaft 28, and spaced from the take-up pulley 26, by a belt 59. When both wheels of the bracket 49 are moved out of engagement with the shutter 31, there is no drive of the film feeding mechanism and the projection of "stills" is accomplished. The tilting bracket is adapted to be moved by the edge cam, generally indicated at 48, on the control member through the medium of a lever 60 pivoted at 61 to a bracket 100 carried by the base of the mechanism compartment 5. The free end of this pivoted lever acts beneath a projection 63 of the bracket 49 which is held in contact therewith by means of a spring 56.

So that rewinding of the film at high speed and cutting off the lamp during the rewinding operation may be accomplished automatically by setting the single control member, the following structure and electrical hookup is provided. Referring to Figs. 2 and 4, the electric circuit for the projector shows the lamp 23 and the motor 55 along with the variable resistance 64 therefor, connected in parallel, the variable resistance being provided for controlling the speed of the motor. A double pole switch 65 is connected in this circuit so that in one position, in dotted line position Figs. 2 and 4, it connects the lamp, motor and the variable resistance for the motor into the circuit, so that the current flows through all of them. The double pole switch will be in this position during normal projection, reverse projection and the projection of "stills." In the other position of the double pole switch, the lamp 23 is cut out of the circuit and the variable resistance is short circuited so that the projector runs at high speed with the lamp out. This latter position, full line position Figs. 3 and 4, of the switch is used in rewinding and the switch 65 is controlled or moved between its two positions by projection 66 on the control member which engages arms 75 and 80 of the switch, see Fig. 4, to throw the switch between its two positions, as the control member moves between its predetermined positions. The control member carrying the multiple cam may be provided with an arm 68 which extends through a slot 69 in the top of the mechanism compartment 5 for manual operation. This arm is adapted to move across a vertical portion 70' of the mechanism compartment on the surface of which are inscribed the stations R, P, S and RV denoting the position of the arm when the control member is set for rewinding, normal projection, projection of "stills" and reverse projection respectively. When the projector is adapted to permit of normal projection, rewind, still projection, or reverse projection, the number of edge and face cams, along with the projection 66 on the control member, and their relationship to one another are such as to effect the control of parts in the following manner:

*Normal projection*

The arm 68 is set to the position marked P in which a raised part 46 or face cam causes the plunger 36 in the hollow shaft 27 to be moved inwardly so as to disengage the drive pin 39 from the radial groove 70 in the pulley. This pulley is then free on the shaft and no drive is, therefore, transmitted to the pulley 33 on the supply spindle 8.

Simultaneously, a depressed, diametrically disposed sunk part 47' of the control member permits the plunger 37 in the lower shaft 28 to move into pin and slot engagement with a radial groove 72 in the pulley 26 which is connected by the belt 34 to the pulley 35 on the take-up spindle 10. This results in such spindle being positively driven. The correct direction of rotation is achieved by one of the edge cams, i. e. 73, causing, through the medium of a pivoted lever 60, engagement of one of the pair of wheels, i. e. 52, on the pivoted bracket 49 with a shutter pulley 31. In moving to this position the projection 66 on the control member 44 engages the arm 75 of the double pole switch 65 and moves it to a position, see dotted position of Fig. 4, wherein the lamp 23 and variable resistance 64 are connected into the circuit.

*Rewind*

For this position, shown in the drawing, the control member 44 is rotated by the manual control arm 68 into the position R, in which a depressed or sunken portion 47 on the control member comes opposite the upper slidable plunger 36 within the hollow shaft 27, thereby permitting the pin and slot driving engagement to be effected with this pulley, see Fig. 1. Simultaneously, a diametrically disposed raised part 77 of the control member 44 causes the lower plunger 37 to be moved inward to the position shown in Fig. 1 to disengage the driving pin 41 from the pulley 26 connected to the take-up spindle. It will now be appreciated that with the edge cam 73 maintaining the same wheel 52, as for normal projection, in contact with the shutter 31, the pulley 33 on the supply spindle 8 is positively driven to effect rewinding. In order that this may take place at an increased speed, the diameter of the pulley 25 controlled by the upper plunger 36 may be suitably larger than that of the pulley 33 mounted on the supply spindle. The speed of rewinding is further increased when the projection 66, upon the control member 44, moving to this position, engages the arm 80 on the double pole switch 65 and moves it to the position shown in Figs. 2 and 4, whereby the lamp 23 and variable resistance 64 to the motor are cut out of the circuit.

*Still projection*

In order to effect "still" projection it is, of course, necessary to stop the drive to the take-up spindle, and, accordingly, the control member 44 is moved to position S in which a further edge cam 81 acts on the pivoted lever 60 so as to tilt the bracket 49 to such a position at which both wheels 51 and 52 are out of contact with the shutter 31. Consequently, in spite of the fact that the positive driving connection is maintained between the lower pulley 26 and the take-up spindle, no drive is transmitted from the motor. In moving to this position the projection 66 contacts arm 75 of the double pole switch and moves the same so as to put the lamp 23 and variable resistance 64 back into the circuit.

*Reverse projection*

In order to permit reverse running of the film through the projector the pulley 25 is driven by the pulley 58 through the belt 59. The pulley 58 is of smaller diameter compared with the pulley 25 which is conveniently formed with a double groove. The ratio of diameters is such that during reverse operation of the projector, the film can be fed through the film gate at the required speed. For effecting such reverse drive the arm 68 is moved to position RV in which diametrically disposed raised portions 46 and 83 of the control member 44 are effected to move both plungers 36 and 37 out of engagement with pulleys 25 and 26 connected by belts with the pulleys on the supply and take-up spindles. The raised portion 83 controls the lower plunger 37 and is of such a height as to move this plunger further inwardly until the drive pin 41 thereon engages a radial groove 84 in such pulley, thereby producing a driving engagement between pulley 58 and shaft 28. Simultaneously, a third edge cam 86 acts on the pivoted lever 60 so as to tilt the bracket 49 to such position that the other wheel 51 thereon is brought into engagement with the shutter 31. The shutter is now driven in the opposite direction and thus also the shafts 27 and 28, through the medium of the worm 30 and worm wheels 29. It will now be appreciated that the pulley 58 on the lower shaft 28 is driven in a reverse direction to drive the pulley 25 which is now free on the upper hollow shaft 27. The drive is communicated from this at the required speed to the pulley 33 on the supply spindle 8 which thereby also becomes rotated in a reverse direction to cause the film to be drawn through the film gate in a reverse direction. When the control member is moved to the position RV from position S, the projection 66 does not contact either arm 75 or 80 of the double pole switch 65 so that the lamp 23 and the variable resistance 64 are left in the circuit.

Although I have shown and described certain specific embodiments of my invention, I am fully aware that many modifications thereof are possible. My invention, therefore, is not to be restricted, except insofar as is necessitated by the prior art and by the spirit of the appended claims.

Having thus described the present invention, what I declare is new and desire to secure by Letters Patent of the United States is:

1. In a motion picture projector, the combination with a support, a prime mover, a pair of spaced shafts driven from said prime mover, a supply spindle and a take-up spindle rotatably mounted on the support, a releasable clutch normally connecting one spindle to one of said shafts, a second releasable clutch normally connecting the other spindle to the other shaft, of a control member movably mounted on the support adjacent said clutches and movable between two predetermined positions, one indicating a film feeding position and the other a film rewinding position, said control member including a plurality of definitely spaced cam surfaces adapted to alternately engage and release said clutch members one at a time depending upon the position of the control member to satisfy the drive conditions to the spindles necessary for film feeding and film rewinding.

2. In a motion picture projector, the combination with a support, a prime mover, a pair of spaced shafts driven from said prime mover, a supply spindle and a take-up spindle rotatably mounted on the support, a releasable clutch normally connecting one spindle to one of said shafts, a second releasable clutch normally connecting the other spindle to the other shaft, a transmission member between the spaced shafts and the prime mover for transmitting power from the prime mover to said shafts, said transmission member movably mounted on the support between two positions, a first in which it transmits power from the prime mover to the shafts and a second in which it disconnects the shafts from the prime mover, of a control member movably mounted on the support adjacent the clutches and movable between three predetermined positions, one indicating a film feeding position, a second a film rewinding position, and the third a position for projecting "stills," said control member including a plurality of definitely spaced cam surfaces adapted to alternately engage and release said clutch members one at a time to satisfy the drive conditions to the spindles necessary for film feeding and film rewinding, and adapted in its third position to engage and move the transmission member to its second position for projecting "stills."

3. In a motion picture projector, the combination of a prime mover, a support, a supply spindle and a take-up spindle rotatably mounted on said support, film feeding means for advancing a film strip from a reel on one spindle to a reel on the other spindle, a main drive shaft, a pair of spaced parallel shafts connected to said drive shaft to be driven in opposite directions, a pair of clutches each adapted to connect one spindle with one of said parallel shafts, a control member movably mounted on the support between said parallel shafts to move between three predetermined positions, a first indicating film feeding, the second indicating rewinding, and the third indicating projection of "stills," said control member having a plurality of clutch engaging portions so arranged thereon that in the first position of the control member one of said clutches is engaged while the other is disengaged for feeding the film strip, and in a second position the engagement of the clutches is reversed for rewinding the film strip, a transmission member for transmitting power from the prime mover to the main shaft and being movably mounted on the support to be moved between two predetermined positions, one in which it rotates the main shaft in one direction and a second wherein it is disengaged from the main shaft, and a connection between said control member and said transmission member whereby said transmission member is shifted between its two positions as said control member is moved between its predetermined positions.

4. In a motion picture projector, the combination with a prime mover, a supply spindle, a take-up spindle, film feeding means for advancing a film strip from a reel on one spindle to a reel on the other spindle, driving connections between said prime mover, the film feeding means and each of said spindles, and including a pair of parallel tubular shafts interconnected so as to be driven in opposite directions, a driving member rotatably mounted on each of said shafts, the driving member on one shaft being connected to the supply spindle and the driving member on the other shaft being connected to the take-up spindle, a clutch between each driving member and its respective shaft, and comprising a plunger mounted in the tubular shaft to slide axially thereof but rotate therewith, a pin on said plunger adapted in one position of the plunger to engage a radial groove in the driving member to connect the same to shaft, and in the other position of the plunger to be removed from engagement with the driving member whereby the latter is permitted to rotate relative to the shaft, of a clutch control member movably mounted between the two tubular shafts to move between two predetermined positions, and including a plurality of cam surfaces adapted to engage and move said plungers axially of the tubular shafts, said cam surfaces being spaced and arranged relative to one another so that in one position of the control member one spindle is clutched to its respective tubular shaft while the other spindle is unclutched from its respective shaft, and in the other position of the control member the drive to the spindles is reversed.

5. In a motion picture projector, the combination of a prime mover, a support, a supply spindle and a take-up spindle rotatably mounted on the support, film feeding means for advancing a film strip from a reel on one spindle to a reel on the other spindle, a main drive shaft, a pair of spaced parallel shafts connected to said drive shaft to be driven in opposite directions, a pair of clutches each adapted to connect one spindle with one of said parallel shafts, a transmission member for transmitting power from the motor to the main shaft, said transmission member mounted on the support to move between two positions, one in which it rotates the main shaft in one direction for film feeding, and a second position in which it is disconnected from the main drive shaft for the projection of "stills", and a control member mounted on the support to move between three predetermined positions, one designating a film feeding position, another a rewinding position, and the third a position for projecting "stills", said control member including a plurality of definitely spaced clutch-engaging portions adapted to clutch and unclutch the supply and take-up spindles, and including portions for effecting a movement of the transmission member between its two positions.

6. In a motion picture projector, the combination with a support, a supply spindle and a take-up spindle rotatably mounted on the support, an objective, a lamp behind said objective, film feeding means for advancing a film strip from a reel on one spindle to a reel on the other spindle and past the objective, an electric motor for driving said film feeding means, a variable resistance therefor, said electric motor and variable resistance connected in parallel with said lamp, a double pole switch in the lamp and motor circuit movable between two positions, one in which it connects the motor, its variable resistance, and lamp into the line, and a second in which it cuts off the lamp and short circuits the variable resistance of the motor, a pair of spaced shafts driven from the electric motor, a releasable clutch normally connecting one spindle to one of said shafts, a second releasable clutch normally connecting the other spindle to the other shaft, of a control member movably mounted on the support adjacent said clutches and movable between two predetermined positions, a first indicating a film feeding position, and the second a film rewinding position, said control member including a plurality of definitely spaced cam surfaces adapted to alternately engage and release said clutch members one at a time to satisfy the drive conditions to the spindles necessary for film feeding and film rewinding, and a connection between the control member and the double pole switch whereby said switch is moved to its first position when the control member is in its first position and is moved to its second position when the control member is moved to its second position.

7. In a motion picture projector, the combination with a support, a supply spindle and a take-up spindle rotatably mounted on the support, an objective, a lamp behind said objective, film feeding means for advancing a film strip from a reel on one spindle to a reel on the other spindle and past the objective, an electric motor for driving said film feeding means, a variable resistance therefor, said electric motor and variable resistance connected in parallel with said lamp, a double pole switch in the lamp and motor circuit movable between two positions, one in which it connects the motor, its variable resistance, and lamp into the line, and a second in which it cuts off the lamp and short circuits the variable resistance of the motor, a pair of spaced shafts driven from the electric motor, a first clutch normally connecting the supply spindle to one of said shafts, a second clutch having three positions, one in which it normally connects the take-up spindle to the other shaft, a second where it is not connected to anything, and a third position wherein it connects the supply spindle to said latter shaft and releases the take-up reel therefrom, a transmission member for transmitting power from the electric motor to the film feeding means and said shafts, said transmission member movably mounted on the support to move between three positions, a first position in which it drives the film feeding means and shafts in one direction, a second position in which it reverses the direction of said film feeding means and shafts, and a third position in which it disconnects the electric motor from said film feeding means and shafts, of a control member movably mounted on the support between said shafts to move between four positions, a first position indicating film feeding for projection, a second position indicating film rewinding, a third position indicating film reversing, and the fourth indicating the projection of "stills", said control member including a plurality of cam surfaces for actuating the clutches and moving the transmission member and a portion for throwing said double pole switch, said cam surfaces and switches engaging portion being of such contour and being so positioned relative to one another that when the control member is in its first position the first clutch is disengaged, the switch is moved to its first position, and the transmission member is moved to its first position; when the control member is in its second position, the second clutch is moved to its second position, the first clutch assumes its normal position, the switch is moved to its second position but the transmission member is not moved; when the control member is in its third position, the first clutch member is disengaged, the second clutch is moved to its third position, the switch is moved to its first position, and the transmission member is moved to its second position; and when the control member is moved to its fourth position the transmission member is moved to its third position.

8. In a motion picture projector, the combination with a support, a supply spindle and a take-up spindle rotatably mounted on the support, an objective, a lamp behind said objective, film feeding means for advancing a film strip from a reel on one spindle to a reel on the other spindle and past the objective, an electric motor for driving said film feeding means, a variable resistance therefor, said electric motor and variable resistance connected in parallel with said lamp, a double pole switch in the lamp and motor circuit movable between two positions, one in which it connects the motor, its variable resistance, and lamp into the line, and a second in which it cuts off the lamp and short circuits the variable resistance of the motor, a pair of spaced shafts driven from the electric motor, a first clutch normally connecting the supply spindle to one of said shafts, a second clutch having three positions, one in which it normally connects the take-up spindle to the other shaft, a second where it is not connected to anything, and a third position wherein it connects the supply spindle to said latter shaft and releases the take-up reel therefrom, a transmission member for transmitting power from the electric motor to the film feeding means and said shafts, said transmission member movably mounted on the support to move between two positions, a first in which it drives the film feeding means and the spaced shafts in one direction, and a second position in which it reverses the direction of said film feeding means and said shafts, of a control member movably mounted on the support between said shafts to move between three predetermined positions, a first indicating film feeding, the second indicating film rewinding, and the third indicating film reversing, said control member including a plurality of cam surfaces for actuating the clutches and moving the transmission member and a projection for engaging and moving said double pole switch, said cam surfaces and projection being of such contour and being so positioned relative to one another that when the control member is in its first position the first clutch is disengaged, the switch is moved to its first position, and the transmission member is moved to its first position; when the control member is in its second position, the second clutch is moved to its second position, the first clutch assumes its normal position, the switch is moved to its second position, but the transmission member is not moved; and when the control member is in its third position, the first clutch is disengaged, the second clutch is moved to its third position, the switch is moved to its first position and the transmission member is moved to its second position.

9. In a motion picture projector, the combination with a support, a supply and a take-up spindle rotatably mounted on the support, a prime mover, film feeding means for advancing a film strip from a reel on one spindle to a reel on the other spindle, driving connections between said prime mover, the film feeding means and each of said spindles, and including a pair of spaced parallel shafts interconnected so as to be driven in opposite directions, a clutch normally connecting the supply spindle to one of said shafts, a second clutch having three positions, one in which it normally connects the take-up spindle to the other shaft, a second where it is not connected to anything, and a third position wherein it connects the supply spindle to said latter shaft and releases the take-up spindle therefrom, a transmission member for transmitting power from the prime mover to the film feeding means and said shafts, said transmission member movably mounted on the support to move between two positions, a first in which it drives the film feeding means and shafts in one direction, and a second position in which it reverses the direction of said film feeding means and shafts, of a control member movably mounted on the support between said shafts to move between three positions, a first indicating film feeding, the second indicating film rewinding, and the third indicating film reversing, said control member including a plurality of cam surfaces for actuating the clutches, and moving the transmission member, said cam surfaces being of such a contour and being so positioned relative to one another that when the control member is in its first position the first clutch is disengaged and the transmission member is moved to its first position; when the control member is in its second position, the second clutch is moved to its second position, the first clutch assumes its normal position, and the transmission member is not moved; and when the control member is in its third position, the first clutch is disengaged, the second clutch is moved to its third position, and the transmission member is moved to its second position.

10. In a motion picture projector, the combination with a support, a supply spindle and a take-up spindle rotatably mounted on the support, an objective, a lamp behind said objective, film feeding means for advancing a film strip from a reel on one spindle to a reel on the other spindle and past the objective, an electric motor for driving said film feeding means, a variable resistance therefor, said electric motor and variable resistance connected in parallel with said lamp, a double pole switch in the lamp and motor circuit movable between two positions, one in which it connects the motor, its variable resistance, and lamp into the line, and a second in which it cuts off the lamp and short circuits the variable resistance of the motor, a pair of spaced shafts driven from the electric motor, a releasable clutch normally connecting one spindle to one of said shafts, a second releasable clutch normally connecting the other spindle to the other shaft, a transmission member for transmitting power from said motor to the film feeding means and shafts, said transmission member movably mounted on the support to move between two positions, a first in which it drives the film feeding means and shafts, and a second in which it disconnects the motor from the film feeding means and said shafts, of a control member movably mounted on the support adjacent said clutches and movable between three positions, a first position indicating film feeding for projecting, a second indicating film rewinding, and a third position indicating the projection of "stills," said control member including a plurality of cam surfaces for actuating the clutches and moving the transmission member and a projection for moving said double pole switch, said cam surfaces and projection being of such contour and being so positioned relative to one another that when the control member is in its first position the first clutch is disengaged, the transmission member is moved to its first position and the double pole switch is moved to its first position; when the control member is in its second position, the first clutch assumes its normal position, the second clutch is disengaged, the transmission member remains in its first position, and the switch is moved to its second position; and when the control member is in its third position, the transmission member is moved to its second position and the switch is moved to its first position.

11. In a motion picture projector, the combination with a support, a supply and a take-up spindle rotatably mounted on the support, a prime mover, film feeding means for advancing a film strip from a reel on one spindle to a reel on the other spindle, driving connections between said prime mover, the film feeding means and each of said spindles, and including a pair of spaced parallel shafts interconnected so as to be driven in opposite directions, a clutch normally connecting the supply spindle to one of said shafts, a second clutch having three positions, one in which it normally connects the take-up spindle to the other shaft, a second where it is not connected to anything, and a third position wherein it connects the supply spindle to said latter shaft and releases the take-up spindle therefrom, a transmission member for transmitting power from the prime mover to the film feeding means and said shafts, said transmission member movably mounted on the support to move between three positions, a first in which it drives the film feeding means and shafts in one direction, a second position in which it reverses the direction of said film feeding means and shafts, and a third position in which it disconnects the prime mover from said film feeding means and shafts, of a control member movably mounted on the support between said shafts to move between four positions, a first indicating film feeding, a second indicating film rewinding, a third indicating film reversing, and a fourth indicating the projecting of "stills," said control member including a plurality of cam surfaces being of such contour and being so positioned relative to one another that when the control member is in its first position the first clutch is disengaged, and the transmission member is moved to its first position; when the control member is in its second position, the second clutch is moved to its second position, the first clutch assumes its normal position, and the transmission member is not moved; when the control member is in its third position, the first clutch is disengaged, the second clutch is moved to its third position, and the transmission member is moved to its second position; and when the control member is in its fourth position the transmission member is moved to its third position.

12. In a motion picture projector, the combination with a support, a supply and a take-up spindle rotatably mounted on the support, a prime mover, film feeding means connected to said prime mover for advancing a film strip from a reel on one spindle to a reel on the other spindle, a shaft connected to said prime mover, a clutch movable between two positions, a first in which it normally connects the take-up spindle to the shaft and a second wherein it connects the supply spindle to the shaft and releases the take-up spindle therefrom, a transmission member for transmitting power from the prime mover to the film feeding means and said shaft, said transmission member movably mounted on the support to move between two positions, a first in which it drives the film feeding means and said shaft in one direction, and a second position wherein it reverses the direction of said film feeding means and said shaft, of a control member movably mounted on the support adjacent said shaft to move between two positions, a first indicating film feeding for projection, and a second indicating film reversing, said control member including a plurality of cam surfaces for actuating the clutch and moving the transmission member, said cam surfaces being of such contour and being so positioned relative to one another that when the control member is in its first position, the transmission member is moved to its first position, and the clutch remains in its normal position, and when the control member is in its second position, the clutch is moved to its second position and the transmission member is moved to its second position.

13. In a motion picture projector, the combination with a support, a supply and a take-up spindle rotatably mounted on the support, a prime mover, film feeding means connected to said prime mover for advancing a film strip from a reel on one spindle to a reel on the other spindle, a shaft connected to said prime mover, a clutch movable between two positions, a first in which it normally connects the take-up spindle to the shaft, and a second wherein it connects the supply spindle to the shaft and releases the take-up spindle therefrom, a transmission member for transmitting power from the prime mover to the film feeding means and said shaft, said transmission member movably mounted on the support to move between three positions, a first in which it drives the film feeding means and shaft in one direction, a second wherein it reverses the direction of said film feeding means and said shaft, and a third position in which it disconnects the prime mover from said film feeding mechanism and shaft, of a control member movably mounted on the support adjacent said shaft to move between three positions, a first indicating film feeding for projection, the second indicating film reversing, and the third indicating the projection of "stills," said control member including a plurality of cam surfaces for actuating the clutch and moving the transmission member, said cam surfaces being of such contour and being so positioned relative to one another that when the control member is moved to its first position the clutch is normally held in its first position, and the transmission member is moved to its first position; when the control member is in its second position, the clutch is moved to its second position, and the transmission member is moved to its second position; and when the control member is in its third position, the transmission member is moved to its third position.

14. In a motion picture projector the combination with a support, a supply spindle and a take-up spindle rotatably mounted on said support, a prime mover, means for advancing a film strip from a reel on one spindle to a reel on the other spindle, said means including a pair of parallel tubular shafts driven from the prime mover and interconnected so as to be driven in opposite directions, a plunger movably mounted within each of said tubular shafts to move axially of the shaft but rotate therewith, a driving pin fixed to each of said plungers and extending radially of the shaft, a double pulley rotatably mounted on one shaft, said pulley having a radial groove in one face adapted to receive the drive pin on the plunger in the shaft on which the pulley is mounted, two pulleys rotatably mounted on the other shaft in spaced relation, each of said pulleys having a radial groove in one face adapted to receive the driving pin on the plunger in said shaft when the latter is moved axially of the shaft, the first of said two pulleys being connected to the take-up spindle and the second of said pulleys being connected to the double pulley, a transmission member for transmitting power from the prime mover to said shafts, said transmission member movably mounted on the support to move between two positions, a first in which it drives the shafts in one direction, and a second wherein it reverses the direction of drives of said shafts, of a control member movably mounted on the support adjacent the plungers to move between three positions, a first indicating film being fed from the supply spindle to the take-up spindle, a second indicating film rewinding, and the third position indicating film reversing, said control members including a plurality of cam surfaces for engaging and moving the plungers and for moving the transmission member, said cam surfaces being of such contour and being so positioned relative to one another that when the control member is moved between its three positions the pulleys are clutched and unclutched to the shafts in the correct relation, and the transmission member is moved giving the correct direction of drive to the film means to effect the film drive indicated by the position of the control member.

15. In a motion picture projector, the combination with a support, a supply spindle and a take-up spindle rotatably mounted on said support, a prime mover, means for advancing a film strip from a reel on one spindle to a reel on the other spindle, said means including a pair of parallel tubular shafts driven from the prime mover and interconnected so as to be driven in opposite directions, a plunger movably mounted within each of said tubular shafts to move axially of the shaft but rotate therewith, a driving pin fixed to each of said plungers and extending radially of the shaft, a double pulley rotatably mounted on one shaft, said pulley having a radial groove in one face adapted to receive the drive pin on the plunger in the shaft on which the pulley is mounted, two pulleys rotatably mounted on the other shaft in spaced relation, each of said pulleys having a radial groove in one face adapted to receive the driving pin on the plunger in said shaft when the latter is moved axially of the shaft, the first of said two pulleys being connected to the take-up spindle and the second of said pulleys being connected to the double pulley, a transmission member for transmitting power from the prime mover to said film advancing means, said transmission member movably mounted on the support to move between three positions, a first in which it drives the film advancing means in one direction, a second in which it reverses the direction of drive of said film advancing means, and a third position wherein it disconnects the film advancing means from the prime mover, of a control member movably mounted on the support to move between four positions, one indicating film being fed for projection, a second position indicating film rewinding, a third position indicating film reversing, and a fourth position indicating the projection of "stills," said control member including a plurality of cam surfaces for moving the plungers and for moving the transmission member, said cam surfaces being of such contour and being so positioned relative to one another that when the control member is moved between its four positions, the pulleys are clutched and unclutched to the shafts in the correct relation and the transmission member is moved, giving the correct direction of drive to the film feeding means to effect the film drive indicated by the position of the control member.

16. In a motion picture projector, the combination with a support, a supply spindle and a take-up spindle rotatably mounted on said support, a prime mover, means for advancing a film strip from a reel on one spindle to a reel on the other spindle, said means including a pair of parallel tubular shafts driven from the prime mover and interconnected so as to be driven in opposite directions, a plunger movably mounted within each of said tubular shafts to move axially of the shaft but rotate therewith, a driving pin fixed to each of said plungers and extending radially of the shaft, a double pulley rotatably mounted on one shaft, said pulley having a radial groove in one face adapted to receive the drive pin on the plunger in the shaft on which the pulley is mounted, two pulleys rotatively mounted on the other shaft in spaced relation, each of said pulleys having a radial groove in one face adapted to receive the driving pin on the plunger in said shaft when the latter is moved axially of the shaft, the first of said two pulleys being connected to the take-up spindle, and the second of said pulleys being connected to the double pulley, means for reversing the direction of drive of said film feeding means and movable between two positions for accomplishing its reversing action, of a control member movably mounted on the support to move between three positions, a first position indicating normal projection, a second position indicating film rewinding, and a third position indicating film reversing, said control member including a plurality of cam surfaces for moving the plungers and for moving the reversing means, said cam surfaces being of such contour and being so positioned relative to one another that when the control member is moved between its three positions, the pulleys are clutched and unclutched to the shafts in the correct relation and the reversing means is moved, giving the correct direction of drive to the film feeding means to effect the film drive indicated by the position of the control member.

HUGO NAGEL.